United States Patent
Carson

Patent Number: 5,435,266
Date of Patent: Jul. 25, 1995

[54] BIRD CAGE FEEDER ASSEMBLY

[76] Inventor: Frank L. Carson, 7512 Saybrook Trail, Jonesboro, Ga. 30236

[21] Appl. No.: 269,749

[22] Filed: Jul. 1, 1994

[51] Int. Cl.⁶ ............................................. A01K 31/00
[52] U.S. Cl. .......................................................... 119/18
[58] Field of Search ................. 119/18, 61, 63; 49/171

[56] References Cited

U.S. PATENT DOCUMENTS

| | | | |
|---|---|---|---|
| 1,186,782 | 6/1916 | Hercer. | |
| 1,602,000 | 10/1926 | Custer | 119/63 |
| 1,900,868 | 3/1933 | Ritchie. | |
| 2,007,917 | 7/1935 | McGrew | 119/18 |
| 2,612,862 | 10/1952 | Ipsen | 119/18 |
| 3,089,461 | 5/1963 | Dunn | 119/63 |
| 3,429,297 | 2/1969 | Schroer | 119/18 |
| 5,152,247 | 10/1992 | Brown | 119/18 |
| 5,152,248 | 10/1992 | Hart | 119/61 |

FOREIGN PATENT DOCUMENTS 0248108 9/1987 European Pat. Off..
667570 10/1929 France.
1239971 7/1960 France.

*Primary Examiner*—Thomas Price
*Attorney, Agent, or Firm*—Hopkins & Thomas

[57] ABSTRACT

A bird cage (10) having a feeder assembly (11) mounted externally of the cage. The feeder assembly includes a tray (63) having a pair of receptacles (71 and 72) mounted within the tray (66). A cover (73) rotatable between a closed position covering the receptacles (71 and 72) to prevent access thereto from outside of the cage (10) while enabling access by the birds within the cage and an open position uncovering the receptacles (71 and 72). With the cover (73) in its open position, the receptacles (71 and 72) can be removed from the tray (63) for cleaning and refilling while retarding access thereto by the birds in the cage to prevent the birds from escaping from the cage as their food and water is changed.

13 Claims, 3 Drawing Sheets

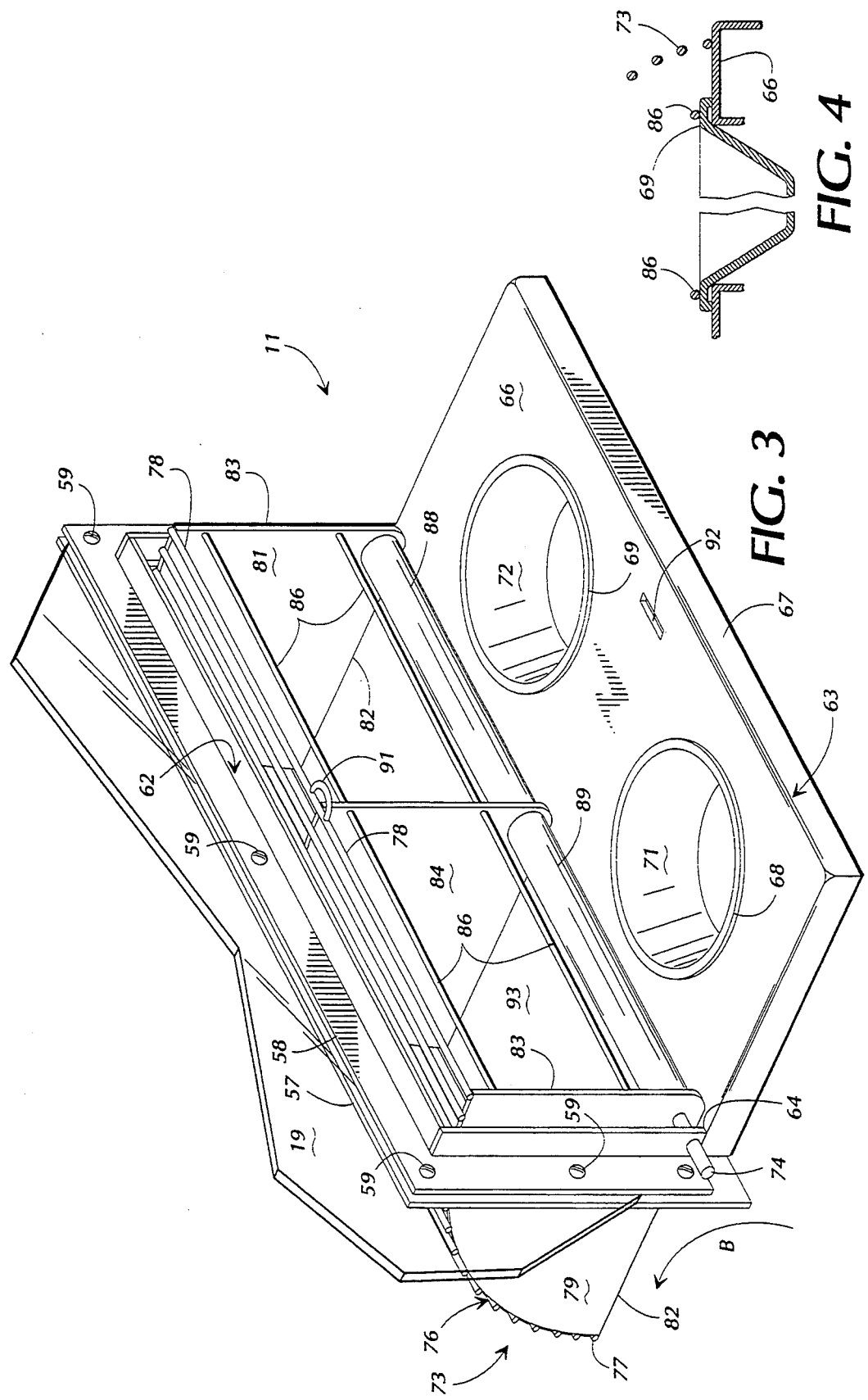

BIRD CAGE FEEDER ASSEMBLY

FIELD OF THE INVENTION

The present invention relates in general to enclosures for birds and animals. In particular, the present invention relates to a cage enclosure for birds such as parrots, having a feeder assembly mounted externally on the cage and communicating with the interior of the cage.

BACKGROUND OF THE INVENTION

Birds have been popular pets for many years. Recently, the popularity of more exotic species of birds such as parrots macaws, cock-a-tiels, and other tropical birds has greatly increased. Such exotic birds represent a significant investment for their owners, with some species costing several thousands of dollars, not to mention the sentimental attachment of the birds as pets. These birds are also often very skittish or easily spooked around unfamiliar persons, which can cause them to react defensively. Since parrots, macaws, and other large tropical birds have very strong beaks that can sever or crush a person's fingers or hands, there is a significant risk of injury to those around the birds. Accordingly, to protect the investment in the birds and for the safety and health of the birds and those around them, most bird owners typically keep their birds in large cages or enclosures.

The problem with most conventional bird cages is, however, that to clean the feeding area or change the food and water in most cages, the main door of the cage must be opened and the attendant must reach inside the cage for the bowls for cleaning and refilling. With the door open, there is a danger that the bird can, of course, escape.. Further, while the bird's owner may be experienced with handling the bird and may be able to reach into the cage with relative safety and a minimal risk of being bitten by the bird, there can be a serious risk of injury to a novice or one with whom the bird is unfamiliar reaching into the cage and manipulating the bird's food and water receptacles.

Most birds typically are somewhat messy when eating and have a tendency to drop food or other matter, including feces, in their food and water receptacle and they also tend to mix the food and water. As a result, the food and water receptacles of birds often become contaminated. Many of these tropical species of birds have very delicate digestive systems and are highly sensitive to diseases and illnesses resulting from contaminated food or water. The food and water dishes of the cages thus must be monitored and cleaned constantly to prevent the birds from eating or drinking contaminated water or food and becoming sick. Constant attention, therefore is required for the proper care of the birds, which care cannot normally be delegated to friends or other family members not familiar with the care and handling of birds such as parrots, macaws, or other large birds. Bird owners typically are limited in travel and other activities as a result, as it is often difficult to find competent persons to care for their birds properly, and there is always a danger of the birds escaping or otherwise injuring the person caring for them if the person must open the cage and/or reach inside the cage to clean the cage or change the food and water of the birds.

Feeders have been developed for the care and feeding of animals such as birds, which are generally mounted to a side wall of the cage and which enable access to the food and water of the birds from the outside of the cage. For example, U.S. Pat. No. 5,000,121 of Daily shows a typical bird cage with a food tray that snaps into an opening in a side wall of the cage. Further, French Patent Nos. 667,570 of Louchet and 1,239,971 of Schneebalg disclose pivoting feeder assemblies for cages which are mounted to a side wall of a cage and which can be pivoted into and out of the interior of the cage to enable the feeder to be refilled. The problem with such devices appears to be that while the feeder can be pivoted into or out of the cage for refilling, these feeders open to the interior of the cage and are therefore easily contaminated and cannot be easily removed from the cage itself for easy and complete cleaning. As stated above, birds such as parrots, macaws, and other tropical species generally have very delicate digestive systems and therefore it is imperative that the food and water receptacles of the cage be thoroughly cleaned.

Additionally, U.S. Pat. No. 1,900,868 discloses an animal feeder comprising a box or similar structure mounted externally of the animal cage, forming a tunnel or channel having a food bowl at one end and having a series of swinging doors that can be manipulated to close off the box from the interior of the cage and another door which can be opened to expose the food bowl for refilling and cleaning. The problem with such a feeder is that while small four-legged animals can easily move along the tunnel or passage formed by the box to reach the food bowl, birds, especially large tropical birds such as parrots and macaws, cannot easily move along this passage and indeed generally will not move into or along a tunnel. Further, there is no way to see exactly where the animal is inside the feeder box, and thus lowering the inner trap door could injure the animal if it is in the feeder box at the time the box is being opened for refilling and cleaning the food bowls. Finally, the device is relatively more complex to use than the current invention in that it involves several hinged doors, and requires several sequential manipulations to properly isolate the caged animal, any of the manipulations which, if executed out of proper sequence, could permit animal escape or injury.

Accordingly, it can be seen that a need exists for a feeder assembly for a bird cage for housing large tropical birds such as parrots, macaws, and the like which enables quick and easy access to the food and water receptacles of the feeder assembly from outside of the bird cage so that the main cage door need not be opened, to enable the quick and easy cleaning of the food and water bowls without danger of the birds escaping from the cage and with a minimal risk of injury to the attendant by the birds and to the birds themselves when changing the food and water.

SUMMARY OF THE INVENTION

Briefly described, the present invention comprises a bird cage and feeder assembly for the care and feeding of birds such as parrots, macaws, and other birds. The bird cage includes a lower base portion that generally is substantially square or rectangularly shaped, having a series of side walls and a bottom wall or floor. The side and bottom walls define an open-ended receptacle within the base for the collection of dirt and debris. An upper cage portion is removably mounted to the base and is positioned over the open-ended receptacle thereof.

The upper cage portion generally has the same configuration as the base and includes a series of side walls, an upper or top wall, and a lower wall or floor. The side walls generally are formed from glass or a mesh or screen material such as metal wire. Typically, the lower or bottom wall is formed from a wire mesh sized so as to enable food and debris to fall therethrough but restricts the passage of the bird or birds contained within the upper cage therethrough. A main cage door is formed in one side wall of the upper cage portion and includes a door frame and a door body typically formed from a mesh material. The main door enables access into and out of the upper cage portion to enable the birds to be removed from and put into the cage and to permit cleaning of the upper cage portion as desired.

The feeder assembly is side mounted to a side wall of the upper cage assembly adjacent the wall containing the main cage door. The feeder assembly generally includes a substantially rectangularly shaped mounting frame having a first mounting bracket positioned on the interior of the cage side wall and a second mounting bracket positioned on the exterior of the cage side wall. The mounting brackets are attached to each other through the cage side wall to secure the brackets thereto. The mounting brackets define a substantially rectangular or square-shaped opening or passage through the side wall of the upper cage. A tray is mounted to a lower edge of the mounting frame, projecting laterally from the side wall of the upper cage. Typically, the tray is formed from a rigid metal or plastic material and has a substantially smooth upper surface to enable the tray to be easily wiped down or cleaned. A pair of spaced openings are formed in the tray, in which a pair of receptacles or bowls are received for containing food and water for the birds in the upper cage.

A cover is rotatably mounted to the second bracket of the mounting frame. The cover is rotatable from a closed position, covering the receptacles of the tray and preventing access thereto from outside the cage while enabling access to the receptacles by the birds within the upper cage, to an open position, uncovering the receptacles to permit access thereto by an attendant outside the cage while retarding access to the receptacles by the birds inside the upper cage. The cover generally is a substantially quarter-cylindrically shaped member and has an arcuate top portion formed from wire or mesh. The top portion has a first edge adapted to pass through the passage defined by the first and second mounting brackets, and a second edge spaced from the first edge and adapted to engage the upper surface of the tray when the cover is in its closed position.

A pair of end walls are mounted to the side edges of the arcuate portion, sealing the side edges of the cover. A divider is mounted to the cover between the side walls. The divider is positioned so as to engage the tray between the food and water receptacles when the cover is in its closed position. Thus, the food and water receptacles are compartmentalized so that, although accessible to the bird, the food and water are kept separate to avoid mixing and contamination thereof, but are maintained in close proximity so that they can both be quickly and easily cleaned at the same time as part of the same feeder assembly.

Various objects, features, and advantages of the present invention will become apparent upon reading the following specification, when taken in conjunction with the accompanying drawings.

BRIEF DESCRIPTION OF THE DRAWINGS

FIG. 3 is a perspective illustration of the feeder assembly showing the feeder assembly in its opened position for the cleaning and refilling of the food and water receptacles.

FIG. 4 is an end cross-sectional view illustrating the engagement of the retainer bars with the receptacles of the feeder assembly.

DETAILED DESCRIPTION OF THE PREFERRED EMBODIMENT

Figure 1:
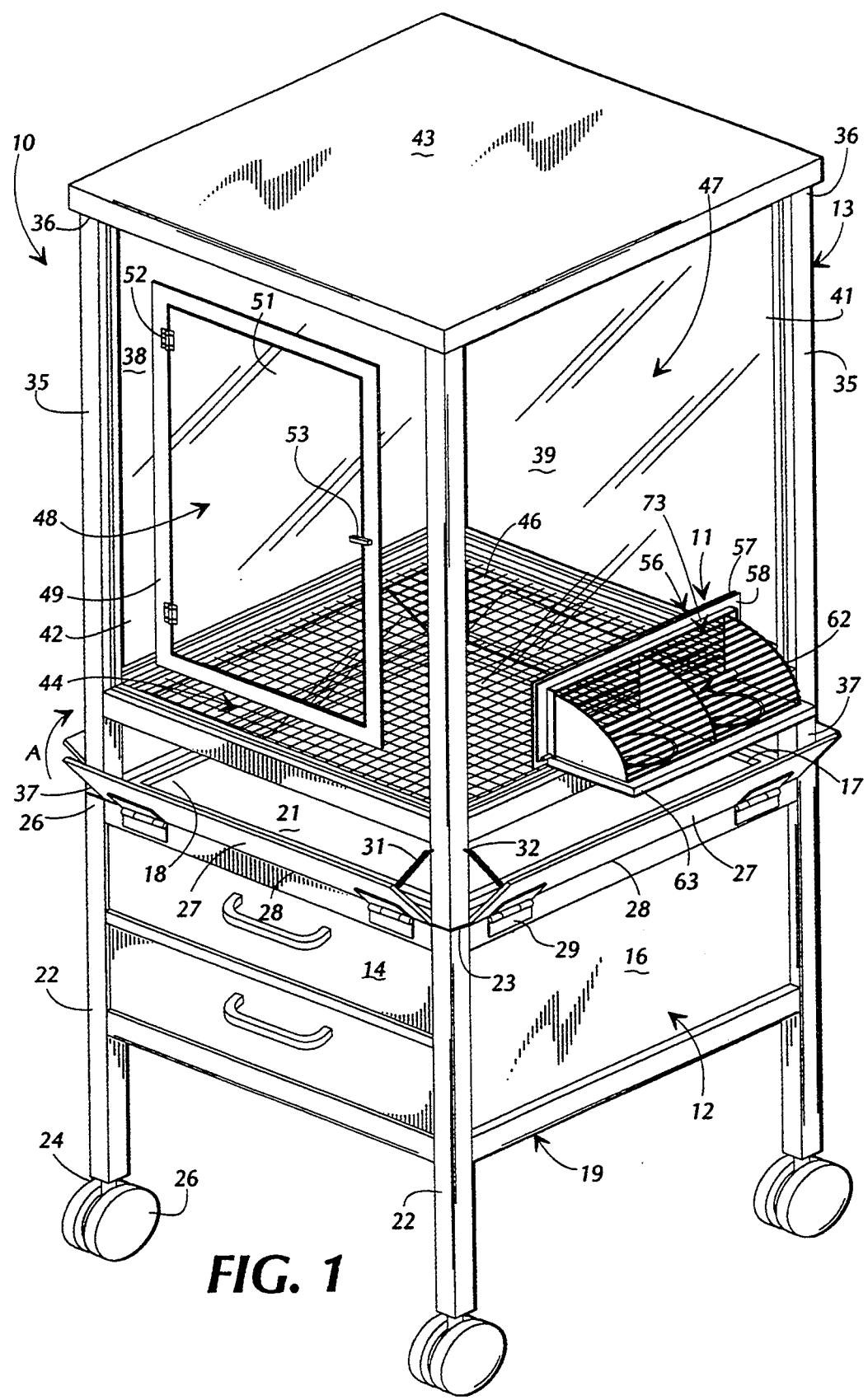
FIG. 1 is a perspective view of the bird cage with the feeder assembly mounted to a side wall thereof.

Referring now in greater detail to the drawings in which like numerals indicate like parts throughout the several views, FIG. 1 illustrates a bird cage 10 with feeder assembly 11 for the containment and care of birds, such as parrots, macaws, cock-a-tiels, etc. The bird cage 10 includes a base portion 12 and an upper cage 13 which are detachably mounted to one another for ease of clean-up, transport, and storage.

The base 12 generally is a substantially rectangular or square-shaped box, although other configurations can be used if desired, having a series of four side walls 14, 16, 17, and 18, and a bottom wall or floor 19. The side walls and bottom of the base 12 are preferably formed from wood or metal, although other materials can be used, and the exterior surfaces of the walls can be formed having a decorative or ornamental appearance as shown in FIG. 1. The side walls 14–18 and bottom 19 define an open-ended receptacle or chamber 21 adapted to receive and collect debris such as food, etc., from the upper cage 13. The base further includes a series of legs 22 formed from metal, wood or similar material, mounted at the corners between the side walls 14–18. The legs 22 are vertically extending beams each having an upper end 23 and a lower end 24. Rollers 26, such as caster wheels or similar rolling means, are mounted at the lower ends of the legs 24 for ease of movement of the base. Pegs or dowels (not shown) at the upper ends 23 of the legs 22 are provided for mounting the upper cage to the base.

A series of flaps 27 are attached to the upper edges 28 of the side walls 14–18 of the base 12 by pairs of hinges 29. The hinges 29 pivotally mount the flaps 27 to the upper edges of the side walls so that the flaps can be pivoted or flipped up in the direction of arrows A to an angled position shown in FIG. 1. Chains 31 or similar attachment means are attached to the flaps and attach to the upper cage via hooks 32 mounted to the upper cage. The attachment of the chains to the hooks secures the flaps in their raised, angled configuration shown in FIG. 1 such that the flaps act as baffles or a funnel for deflecting debris falling slightly outside the cage enclosure into the chamber 21 within the base. The hinged mounting of the flaps further enables the flaps to be folded against the base to enable the bird cage to pass through doorways and cramped spaces.

As FIG. 1 illustrates, the upper cage 13 has substantially the same rectangular or square-shaped configuration as the base 12, and includes a series of four vertically extending posts 35. The posts typically are beams of a similar wood, metal, or other material as that of the legs 22 of the base 12 and are designed to match the legs of the base. The posts each have an upper end 36 and a lower end 37. Openings or bores (not shown) are formed in the lower ends of the posts and receive the pegs (not shown) of the legs 22 of the base 12 for detachably mounting the upper cage to the base. As a result, the upper cage 13 is securely mounted to the base against tipping or lateral movement, but can be easily picked up and removed from the base for ease of cleaning, transport, or storage.

The upper cage 13 further includes a series of side walls 38, 39, 41, and 42 that typically are substantially rectangularly shaped panels mounted between the vertical posts 35. The side walls generally are formed from a material such as a mesh, wire, or, if desired, a glass or plexiglass material. A top portion 43 is mounted to the upper ends 36 of the posts 35, sealing the tops of the side walls 38, 39, 41, and 42, and a bottom portion 44 is mounted parallel to the top portion 43, spaced therefrom and mounted to the posts 35 adjacent the lower ends 37 thereof. The top portion is shown here as a solid plate or cover, although it will be understood by those skilled in the art that the top portion can be formed from a mesh or wire screen material if so desired.

As FIG. 1 illustrates, the bottom portion 44 of the upper cage 13 is mounted directly over the open end of the receptacle 21 of the base 12 and generally is a mesh or screen formed from a metal or similar material having a series of openings 46 formed therethrough. These openings are sized so as to enable debris such as spilled food, feces, etc., to fall through the bottom portion and into the chamber 21 of the base, while still preventing access therethrough by the birds contained within the upper cage. The side walls 38, 39, 41, and 42, top portion 43 and bottom portion 44 define a substantially rectangular enclosure area 47 in which the bird or birds (not shown) are housed. The size of the upper cage and thus the size of the enclosure area 47 generally is dependent on the size of the birds being contained within the upper cage, i.e. for larger birds such as macaws and parrots, the enclosure area generally is larger, while for parakeets or smaller birds, the cage can be of a reduced size if desired.

A cage door 48 is mounted in one side wall 38 of the upper cage 13 as shown in FIG. 1. The cage door 48 includes a substantially rectangular door frame 49 defining a door opening and a door body 51 pivotally mounted thereto by hinges 52 mounted along one side edge of the door body 51. The door body generally is formed from the same material as the side walls of the upper cage, and pivots about the hinges to open and close the door opening. A latch 53 is mounted to the opposite side edge of the door 51 and engages the door frame 49 in order to secure the door 51 in a closed and locked position. The door permits access to the interior enclosure area 47 of the cage when necessary to remove or introduce birds into the upper cage or for cleaning and maintenance of the upper cage as necessary.

Figure 2:
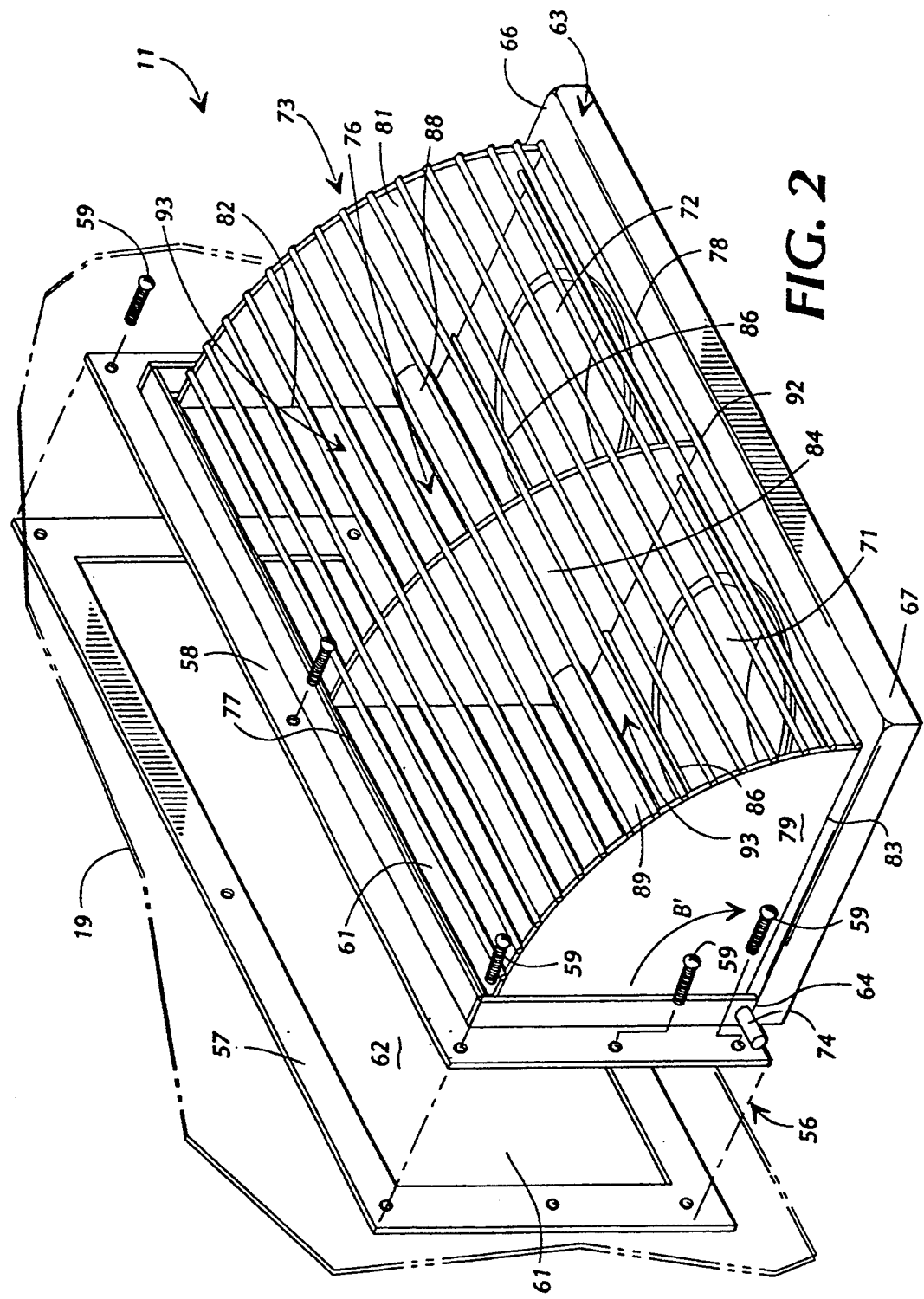
FIG. 2 is a perspective partially exploded view of the feeder assembly with the cover in its closed position, showing the attachment of the mounting frame to a side wall of the cage.

As shown in FIGS. 1-3, the feeder assembly 11 is mounted to one side wall 16 of the upper cage 13 externally of the enclosure area 47 thereof. The feeder assembly includes a mounting frame 56 having a first substantially rectangular shaped mounting bracket 57 positioned along the interior surface of side wall 16, and a second substantially rectangularly shaped mounting bracket 58 positioned along the exterior surface of side wall 16, approximately aligned with the first mounting bracket 57. The mounting brackets are attached to one another through the sidewall by suitable fasteners 59 (FIG. 2) such as bolts or similar means to secure the mounting frame to the cage side wall. As FIGS. 2 and 3 illustrate, the mounting brackets 57 and 58 each have a substantially rectangular shaped opening 57 formed therein, and frame an opening or passage 62 through the side wall 16 (FIG. 1) of the upper cage 13. Each of the brackets generally is formed from a metal such as stainless steel or a similar rigid material and attach to side wall 16 to secure the feeder assembly to the upper cage.

As FIGS. 2 and 3 illustrate, a tray 63 is mounted to the lower edge 64 of the second bracket 58, projecting laterally therefrom in a direction normal to the plane of the opening 62. The tray generally is a horizontally oriented, substantially rectangularly shaped plate formed from a metal such as stainless steel or a similar rigid material that is substantially non-porous and is easy to clean. The tray has an upper surface 66 and a lip 67 extending downwardly from the upper surface 66. A pair of holes 68 and 69 are formed in the upper surface of the tray, spaced from one another. The holes 68, 69 here are depicted as substantially circular in shape, although other shapes can be used as desired.

A pair of receptacles 71 and 72, here shown as substantially semi-cylindrically shaped bowls are received within the bores 68 and 69.. It will be understood that the receptacles generally will be sized and shaped to fit the size and shape of the holes. The receptacles 71 and 72 typically are formed from metal or other substantially rigid high strength material that cannot be easily torn or chewed by the birds and are adapted to receive and contain a supply of food and water for the birds.

As shown in FIGS. 1, 2, and 3, a rotatable cover 73 is pivotally attached to the lower edge 64 of the second bracket 58 by an axle or pivot pin 74. The cover is pivotable in the direction of arrows B and B′ (FIGS. 2 and 3) so as to pivot the cover between a closed position shown in FIG. 2, covering the receptacles from outside of the cage while allowing the birds within the cage access to the food and water within the receptacles, to an open position shown in FIG. 3, uncovering the receptacles for cleaning and refilling of the receptacles while blocking access to the receptacles by the birds within the bird cage.

The cover 73 (FIG. 2) is a substantially quarter-cylindrically shaped member having an arcuate top portion 76 formed from a series of spaced wires or rods of a metal or wire mesh material. The spaced rods or wire mesh enable the attendant to look through the cover when manipulating or rotating the cover so that the presence of the bird within the feeder assembly can be detected so that the bird is not contacted by the rotation of the cover and injured thereby. The arcuate top portion includes a first edge 77, which passes through the passage 62 defined by the opening 61 of the first and second mounting brackets 57 and 58 as the cover is pivoted in the direction of arrows B from its closed position shown in FIG. 2 to its open position shown in FIG. 3, and a second edge 78 which engages the upper surface 66 of the tray 63 when the cover 73 is in its closed position as illustrated in FIG. 2. End walls 79 and 81 are formed at each end of the cover 73. The end walls generally comprise substantially quarter cylindrically or pie-shaped plates having a curved upper edge to which the ends of the rods of the arcuate portion 76 are attached. Each end wall includes a front edge 82 extending in a direction normal to the length of the first edge 77 of the top portion 76 and a rear edge 83 extending at a right angle to front edge 82 and in a direction normal to the length of the second edge 78 of the top portion 76. As shown in FIG. 2, the rear edges 83 of the end walls engage and lie substantially flush against the upper surface 66 of the tray 63 when the cover is in its closed position.

A divider plate 84 is mounted to the top portion 76, positioned intermediate the end walls 79 and 81 of the cover. As shown in FIGS. 1 and 2, the divider plate 84 has a similar substantially quarter-cylindrically or pie-shaped configuration to the end walls 79 and 81 and is positioned so as to engage the upper surface 66 of the tray 63 between the spaced receptacles 71 and 72. The divider plate thus forms a barrier between the two receptacles when the cover is in its closed position (FIG. 2), which prevents the birds from mixing their food and water and thus contaminating their food and water.

As FIG. 3 illustrates, a pair of retainer bars 86 and 87 are mounted to the second or lower edges 83 of the end walls 79 and 81 and the divider plate 84, spaced from one another a distance slightly less than the diameter or width of the receptacles 71 and 72. As shown in FIG. 4, the retainer bars engage the tops of the receptacles adjacent their outer edges when the cover is in its closed position so as to lock the receptacles in place within the tray. As a result, the receptacles are prevented from being pulled upwardly or otherwise dislodged from the tray by the birds.

Perches 88 and 89 (FIG. 3) are positioned along the axle 74, positioned between the end walls 79 and 81 and the divider plate 84 of the cover 73. The perches typically are substantially cylindrically shaped tubes formed from rigid plastic or similar material and are of a substantially greater diameter than that of the axle and provide a means for the birds to grip and stand while eating and drinking from the receptacles.

As FIG. 3 illustrates, a locking hasp is attached to the second edge 78 of the arcuate portion 76 of the cover 73, projecting away therefrom. The locking hasp generally is a U-shaped connector and is received through a slot 92 formed in the upper surface 66 of the tray 63 when the cover is in its closed position shown in FIG. 2. A lock (not shown) or clasp can be placed through the locking hasp 91 in order to lock the cover in its closed, lowered position, in order to prevent children, etc., from inadvertently opening the cover.

The cover 73 of the feeder assembly 11 thus provides a recessed area or chamber 93 positioned outside of the enclosure 47 of the bird cage in which the food and water of the birds within the bird cage is compartmentalized and is kept out of the main enclosure area of the bird cage. The birds are able to stand on their perches and lean their heads into the recesses of the feeder assembly to feed without having to move into the recesses. Further, compartmentalizing the food and water bowls, the birds are given easy access to their food and water to enable the birds to eat and drink without hinderance, but the birds are not able to disturb or otherwise mix or otherwise contaminate their food and water. There is thus a minimal risk of the food and water being mixed and being contaminated thereby or being soiled or otherwise contaminated by feathers, debris, and other material from the interior of the bird cage.

To refill or change the food and water contained within the receptacles 71 and 72 of the feeder assembly 11, it is a simple matter for an attendant to pivot the cover 73 in the direction of arrows B into the upper cage 13. The cover is pivoted into the cage so that the first edges of the end walls and arcuate portion of the cover engage and rest upon the bottom wall of the upper cage as shown in FIG. 3. With the cover in its open position, the birds are denied access to the food and water receptacles from inside the cage. Thus, there is no danger of the birds being able to escape the cage or coming into contact with the hands or arms of the attendant and biting or clawing the attendant while changing the birds' food and water. The attendant simply removes the food and water receptacles for cleaning, and wipes or rinses off the upper surface of the tray with any dirt or debris collected on the upper surface of the tray being directed into the base by the upturned flaps to clean the tray.

Once the receptacles are refilled, the attendant inserts the receptacles 71 and 72 into the holes 68 and 69 of the trays 63 and rotates the cover 73 outward to the closed position in the direction of arrows B'. The cover is rotated to its closed position with the second edges of the end walls and arcuate position engaging the upper surface 66 of the tray 63. In this position, the retainer bars engage and secure the receptacles in the tray, and the cover seals off the receptacles from access outside of the cage, while opening the passage 62 to the receptacles for the birds inside the cage.

Accordingly, it can be seen that the present invention provides a simple and efficient means for the care and feeding of birds, primarily large tropical birds such as parrots, macaws, etc., which enables the receptacles containing the food and water of the birds to be refilled and cleaned quickly and easily without requiring the attendant to reach inside the cage and thus without any danger of the birds escaping from the cage or coming into contact with and thus injuring the attendant.

While the present invention has been described in detail with reference to a preferred embodiment, it will be understood by those skilled in the art that numerous modifications, additions, and changes can be made thereto without departing from the spirit and scope of the invention.

I claim:

1. A bird cage, comprising:
    a base portion;
    an upper cage removably mountable to said base portion and supported thereby, said upper cage having an upper wall, a lower wall, and one or more side walls forming an enclosure for a bird;
    a feeder assembly mounted to one of said side walls of said upper cage, positioned outside of said upper cage said feeder assembly comprising a mounting frame mounted to one of said side walls of said upper cage and defining an opening therethrough, a tray mounted to said mounting frame and projecting laterally outwardly from said side wall and adapted to receive and support a series of receptacles for containing food and water, with said receptacles positioned externally of said upper cage and separated to avoid mixing and contamination of the food and water contained therein and to avoid the introduction of food and water into said upper cage, and a substantially rigid cover means pivotally mounted to said mounting frame so as to be movable from a closed position projecting outwardly from said upper cage and blocking access to said receptacles and said enclosure of said upper cage from outside said upper cage while enabling internal access to said receptacles by the bird in said upper cage, to an open position extending into said upper cage, externally uncovering said tray to enable access to said receptacles from outside said upper cage while blocking internal access to said receptacles by the bird in said upper cage to enable said receptacles to be cleaned and refilled without danger of the bird escaping and with minimal risk of contact with the bird.

2. The cage of claim 1 and wherein said upper wall, said lower wall, and said side walls of said upper cage are formed of a mesh material.

3. The cage of claim 2 and wherein said mesh material comprises a metal material.

4. The cage of claim 1 and wherein said base portion includes an open upper end, a closed lower end and a series of side walls defining an open ended receptacle for collecting debris from said upper cage.

5. The cage of claim 1 and wherein said cover means comprises a substantially quarter-cylindrically shaped member having a first edge adapted to engage said tray with said cover means in its closed position, a second edge adapted to engage said lower wall of said upper cage with said cover means in its open position, an arcuate portion extending between said first and second edges, and spaced parallel side walls mounted to said arcuate portion and extending between said first and second edges.

6. The cage of claim 5 and further including a divider mounted to said arcuate portion of said cover means between said side walls thereof so that as said cover means is lowered to its closed position, said divider is positioned between said receptacles to prevent mixing of food and water in said bowl members.

7. The cage of claim 1 and further including perch means mounted to said mounting frame and extending across said opening thereof to provide a stable support for the bird as the bird feeds from said receptacles.

8. A cage for the care of birds such as parrots having an upper cage portion removably mounted to a cage base and being formed from a mesh material to enable air, light, and debris to pass therethrough without enabling the birds to escape therefrom, the improvement therein comprising:

a feeder assembly having a mounting frame attached to a side wall of the upper cage portion, defining an opening therethrough, a tray aligned with said opening and having a first edge mounted to said mounting frame and a second edge spaced from said first edge and including a series of receptacles for containing food and water received therein and maintained externally of the to prevent contamination of the food and water contained in said receptacles, a cover pivotally mounted to said mounting frame, pivotable between a closed position covering said receptacles from access from outside the upper cage portion while providing access to said receptacles by the bird and an open position substantially sealing said opening through said sidewall to retard internal access to said receptacles by the birds while externally uncovering said receptacles to permit access thereto for cleaning and refilling with food and water and having a first edge adapted to pass through said opening and engage a floor of the upper cage when said cover is in its open position and a second edge spaced from said first edge and adapted to engage said tray when said cover is in its closed position, and means for engaging and locking said receptacles in said tray to retard removal of said receptacles by the birds, mounted to said cover and adapted to engage said receptacles when said cover is in its closed position and to disengage from said receptacles when said cover is moved to its open position to enable removal of said receptacles from said tray for ease of cleaning of said receptacles and said tray.

9. The cage of claim 8 and wherein said feeder assembly further includes a divider plate mounted to said cover and positioned so as to pass between and segregate said receptacles.

10. The cage of claim 8 and further comprising a locking hasp mounted to said cover and received through said tray when said cover is in its closed position, and adapted to receive a locking means for locking said cover in its closed position.

11. The cage of claim 8 and wherein said feeder assembly is formed from stainless steel.

12. The cage of claim 8 and wherein said means for locking said receptacles comprises pairs of retainer bars spaced from one another a distance sufficient to engage a side wall of each of said receptacles without interfering with the access to the food and water therein by the birds.

13. The cage of claim 8 and further including perch means mounted to said mounting frame and extending across said opening thereof to provide a stable support for the bird as the bird feeds from said receptacles.

* * * * *